United States Patent [19]

Shobu et al.

[11] Patent Number: 5,585,313

[45] Date of Patent: Dec. 17, 1996

[54] CERAMIC COMPOSITE MATERIAL WITH HIGH HEAT-RESISTANT PROPERTY

[75] Inventors: Kazuhisa Shobu; Tadahiko Watanabe; Eiji Tani; Morito Akiyama, all of Tosu, Japan

[73] Assignee: Agency of Industrial Science and Technology, Tokyo, Japan

[21] Appl. No.: 296,915

[22] Filed: Aug. 31, 1994

[30] Foreign Application Priority Data

Jan. 26, 1994 [JP] Japan .................................. 6-024782

[51] Int. Cl.$^6$ ................................................. C04B 35/56
[52] U.S. Cl. .............................. 501/89; 501/92; 501/98; 75/236; 428/698
[58] Field of Search .......................... 501/92, 98, 88, 501/89, 153; 75/245, 232, 236, 244; 428/698

[56] References Cited

U.S. PATENT DOCUMENTS

| | | |
|---|---|---|
| 4,626,516 | 12/1986 | Morelock .................... 501/92 |
| 4,698,319 | 10/1987 | Ray ........................... 252/521 |
| 4,793,859 | 12/1988 | Morelock .................... 75/245 |
| 4,847,025 | 7/1989 | White et al. ................ 501/127 |
| 5,079,195 | 1/1992 | Chiang et al. ............... 501/92 |
| 5,196,271 | 3/1991 | White ......................... 501/88 |
| 5,205,970 | 4/1993 | Brun et al. .................. 501/88 |
| 5,294,489 | 3/1994 | Luthra et al. ................ 428/379 |
| 5,364,442 | 11/1994 | Sekhar ........................ 75/229 |

*Primary Examiner*—Paul Marcantoni
*Attorney, Agent, or Firm*—Oblon, Spivak, McClelland, Maier & Neustadt, P.C.

[57] ABSTRACT

The present invention provides a SiC-MoSi$_2$ infiltration material with high heat-resistant property, which can be used at 1500° C. under atmospheric condition, can be produced at lower manufacturing temperature, and can maintain high resistance to oxidation. This ceramic composite material with high heat-resistant property can be obtained by infiltrating aluminum silicide of molybdenum, which is expressed by a formula of Mo(Al$_x$Si$_{1-x}$)$_2$ (where 0.1<x<0.5) into a porous preform of silicon carbide having porosity of 10 to 50% in volume ratio.

7 Claims, No Drawings

CERAMIC COMPOSITE MATERIAL WITH HIGH HEAT-RESISTANT PROPERTY

BACKGROUND OF THE INVENTION

1. Field of the Invention

The present invention relates to a ceramic composite material with high heat-resistant property to be used in the application where high heat-resistant property is required, and in particular to a ceramic composite material with high heat-resistant property, which can be used at 1500° C. or more and has high resistance to oxidation, high creep resistance and excellent high temperature strength under atmospheric conditions.

2. Description of Prior Art

In the past, ceramic materials such as SiC and $Si_3N_4$ have been used for high temperature applications where metals cannot be used. However, these ceramic materials are usually produced by powder molding and sintering processes, and products are often subject to extensive shrinkage and deformation during manufacture. For this reason, further fabrication to finish the product shape is needed, and this leads to high manufacturing cost of the ceramic products.

In general, sintering of heat-resistant material is very difficult to perform, and auxiliary agents to assist sintering must be added to obtain dense products. It is known, however, that these auxiliary agents give adverse effect to mechanical property of the material at high temperature.

On the other hand, reaction sintering method or infiltration method are advantageous in that no shrinking or deformation occurs almost at all during fabrication and dense products can be obtained. For this reason, SiC-Si type materials are widely used in industrial application. These materials are easy to manufacture and have high resistance to oxidation and comparatively high strength. However, metallic Si having melting point of about 1400° C. remains in the structure, and high temperature strength rapidly decreases at temperature of 1300° C. or higher, and these materials cannot be used as structural material at higher temperature.

For this reason, a composite material has been developed by infiltrating $MoSi_2$ having higher melting point and very high resistance to oxidation into SiC (Journal of Materials Science, Vol. 24, pp. 4144–4151; 1989). Because this composite material is manufactured by infiltration method, there is no need to use auxiliary agents, which impair high temperature property. Thus, this material has high resistance to oxidation at high temperature and excellent high temperature strength and can be produced by near-net shape fabrication. However, melting point of $MoSi_2$ is 2000° C. or higher, it is disadvantageous in that high manufacturing temperature is required.

To overcome this drawback, a method has been proposed. According to this method, Si-Mo melt is infiltrated into SiC preform, which contains carbon (Journal of the American Ceramic Society, Vol. 73, No. 5, pp. 1193–1200; 1990). By this method, exothermic reaction of silicon and carbon is utilized, and it is possible to manufacture $SiC$-$MoSi_2$ type composite materials at relatively low temperature of about 1600° C. In this case, however, composition of melt changes as reaction advances, and it is necessary to elaborately assess and control composition and size of the preform and composition of melt, and this is not suitable for industrial application.

In $SiC$-$MoSi_2$ composite materials, surface is covered with silica glass film due to high temperature oxidation, and this leads to high resistance to oxidation. The glass film crystallizes over time, and glass film is cracked due to difference of thermal expansion coefficient during cycles of temperature increase and decrease. In some cases, film spalls off, and resistance to oxidation is reduced.

SUMMARY OF THE INVENTION

To solve the above problems in terms of manufacture and property of $SiC$-$MoSi_2$ composite materials, the present inventors have elaborately studied manufacturing technique of $SiC$-$MoSi_2$ infiltrated composite materials and have found that the problems can be solved by replacing a part of silicon in the infiltrated $MoSi_2$ with aluminum and by turning it to $Mo(Al_xSi_{1-x})_2$ where $0.1<x<0.5$. (Hereinafter it is referred as $Mo(Al,Si)_2$.)

To solve the problems, it is an object of the present invention to provide a material, by which it is possible to solve the problems in manufacture and property of the conventional type $SiC$-$MoSi_2$ composite materials and to produce the material at lower temperature, and which has excellent resistance to oxidation at high temperature.

Specifically, the present invention provides a composite material with high heat-resistant property, which is produced by infiltrating aluminum silicide of molybdenum, which can be expressed by a formula of $Mo(Al_xSi_{1-x})_2$ [where $0.1<x<0.5$], to a porous preform of silicon carbide having porosity of 10 to 50% in volume ratio.

In $Mo(Al,Si)_2$ as described above, x must be within the range of $0.1<x<0.5$ in $Mo(Al_xSi_{1-x})_2$. If x is lower than 0.1, melting point is not decreased very much, and there is little effect to reduce the manufacturing temperature. Also, x is preferably higher than 0.1 from the viewpoint of resistance to oxidation. On the other hand, if x is higher that 0.5, infiltration property is not very good, and it is apparent that high temperature property of the composite material produced becomes lower.

By adjusting the replacement quantity of Si and Al as described above, it is possible to control melting point of $Mo(Al,Si)_2$. (See Table 1.) By adjusting the replacement quantity, it is possible to select composition, in which high temperature property can be expected and which can be produced at the lowest manufacturing temperature.

When a part of silicon in $MoSi_2$ is replaced with aluminum, it is possible to decrease infiltration temperature and to delay crystallization of oxidation film and to maintain resistance to oxidation.

In the present invention, it is possible to use molded material of SiC powder, whisker, or fiber, or calcined product of these meterials as the porous preform of SiC, and further to use SiC-Si sintered material by removing Si from it. Basically, such product may have porosity of 10 to 50% in volume ratio. If the porosity is less than 10%, many pores are closed, and infiltration does not occur. If porosity is more than 50%, good infiltration product cannot be obtained. (See Table 2.)

Porous preform of silicon carbide may be used, which is produced as follows: Pressed powder, which contains boron, carbon, aluminum, or mixture of these materials by less than 10 weight %, is fired, and the porosity is adjusted. There is no special restriction on size of raw material to produce porous material, but it is preferable to use the material with average particle size of 10 μm or less. This makes it possible to manufacture the composite material with uniform and fine structure and excellent mechanical property.

As $Mo(Al,Si)_2$ to be infiltrated into porous preform in the the present invention, composite powder or mass having the desired composition may be used, or powder may be used, in which metal powders of Mo, Al and Si are mixed at the desired ratio. In the latter case, reaction occurs as temperature rises to infiltration temperature, and $Mo(Al,Si)_2$ is produced.

In the preferred embodiment of the present invention, fine powder of SiC in size of 2 μm or less is molded in the desired shape. Such molded material can be obtained, for example, by dispersing SiC in the water, to which a binder such as methyl cellulose is added in small quantity. It is then dried to obtain powder, which is uniaxially molded using dies and is then isotropically compressed by rubber press.

Next, the molded material thus obtained is placed in a graphite crucible. Metal powders of Mo, Al and Si are mixed at the desired ratio to produce another molded material of powder. This is placed on the above molded meterial, and it is heated at temperature higher than the melting point as given in Table 1 in argon gas to infiltrate. The mixed powder of Mo-Si-Al reacts at temperature of 900° to 1300° C. during temperature rise process, and $Mo(Al,Si)_2$ is obtained.

In this way, a compact composite material is prepared, which has SiC skeleton and has pores filled with $Mo(Al,Si)_2$.

The conventional type $SiC-MoSi_2$ composite matererial can be manufactured at temperature of 2000° C. or higher, while the material of the present invention can be manufactured at lower temperature by selecting the composition.

In the material according to the present invention, surface is covered with silica film at high temperature oxidizing atmosphere, and it exhibits high resistance to oxidation. Because the silica film contains aluminum due to oxidation of $Mo(Al, Si)_2$, crystallization of silica can be extensively delayed, and cracking due to difference of thermal expansion can be prevented. As it is evident from Table 2, it is more effective if x is higher than 0.1.

By the ceramic composite material with high heat-resistant property of the present invention, it is possible to obtain a dense composite material, in which manufacturing temperature can be easily controlled and decreased and which exhibits high resistance to oxidation. The material according to the present invention has both high resistance to oxidation and good high temperature mechanical property and can be produced in complex shape by near-net shape fabrication, and it can be used in various applications such as high temperature heating element.

In the following, detailed description will be given on embodiments of the present invention, while it is needless to say that the invention is in no way limited by such embodiments.

DETAILED DESCRIPTION OF THE PREFERRED EMBODIMENTS (Example)

Metal powders of Mo, Al and Si were mixed at a given ratio. The mixed powder was then molded and heated, and the relationship between melting point of $Mo(Al_xSi_{1-x})_2$ and aluminum quantity (x) was measured. The result are given in Table 1.

TABLE 1

| No. | Al quantity (x) | Composition | Melting point |
| --- | --- | --- | --- |
| 1 | 0 | $MoSi_2$ | 2000 ± 10° C. |
| 2 | 0.15 | $MoAl_{0.3}Si_{1.7}$ | to 1920° C. |
| 3 | 0.167 | $MoAl_{0.33}Si_{1.67}$ | 1900 ± 10° C. |
| 4 | 0.35 | $MoAl_{0.7}Si_{1.3}$ | to 1830° C. |
| 5 | 0.5 | $MoAlSi$ | to 1800° C. |
| 6 | 0.75 | $MoAl_{1.5}Si_{0.5}$ | to 1670° C. |

SiC powder having average particle size of 0.4 μm was molded using dies. This was pressurized by rubber press, and a pressed powder material was obtained. The pressed powder material thus obtained had porosity of about 40% in volume ratio. On this material, a molded material produced from powder, in which powders of $Mo_3Al$ and Si are mixed at molar ratio of 1:5, was placed, and this was heated for 10 minutes at 1800° C. under vacuum condition. The mixed powder of $Mo_3Al$ and Si reacted near 1250° C. during temperature rise process and was turned to $Mo(Al_{0.167}Si_{0.833})_2$.

The composite material of $SiC-Mo(Al,Si)_2$ thus prepared was dense with relative density of 95% or more, and it was observed that sufficient melt infiltration occurred even at 1900° C.

The manufacturing condition and infiltration property of this specimen as well as property of surface film after oxidation test for 22 hours at 1500° C. are given in Example 3 of Table 2.

To evaluate the property of oxidation film, oxidation test was performed on the composite material thus obtained, and the surface was examined. As a result, the surface was smooth, and no crack was observed. By X-ray diffraction, the surface was found to be in glass state.

Table 2 shows porosity and infiltration property of the preform. Explaining in detail, SiC powder having average particle size of 0.4 μm was molded and pressurized by rubber press. Into the pressed powder material thus produced, or into a porous material, which was produced from the pressed powder by firing at varying temperature under vacuum condition to adjust porosity, $Mo(Al,Si)_2$ was infiltrated. Table 2 shows manufacturing condition and properties of the composite material. In the table, infiltration temperature means the temperature, which is required to infiltrate to inner portion of the specimen. The oxidation test was performed at 1500° C. for 22 hours under atmospheric condition.

TABLE 2

| No. | Preform density | Al quantity (x) | Composition of infitration material | Infitration temp. |
| --- | --- | --- | --- | --- |
| 1* | 58% | 0 | $MoSi_2$ | 2050° C. |
| 2 | 58% | 0.1 | $MoAl_{0.2}Si_{1.8}$ | 2000° C. |
| 3 | 58% | 0.167 | $MoAl_{0.33}Si_{1.67}$ | 1900° C. |
| 4 | 58% | 0.35 | $MoAl_{0.7}Si_{1.3}$ | 1850° C. |
| 5 | 58% | 0.5 | $MoAlSi$ | 1800° C. |
| 6 | 50% | 0.167 | $MoAl_{0.33}Si_{1.67}$ | 1900° C. |
| 7 | 73% | 0.167 | $MoAl_{0.33}Si_{1.67}$ | 1900° C. |
| 8 | 83% | 0.167 | $MoAl_{0.33}Si_{1.67}$ | 1900° C. |
| 9* | 93% | 0.167 | $MoAl_{0.33}Si_{1.67}$ | 1900° C. |

| No. | Structure of selected material | Property of oxidation film |
| --- | --- | --- |
| 1* | Dense | Cracks all over surface |
| 2 | Dense | No crack |
| 3 | Dense | No crack |

TABLE 2-continued

| | | |
|---|---|---|
| 4 | Dense | — |
| 5 | Infiltration somewhat uneven | — |
| 6 | Infiltration uneven | — |
| 7 | Dense | — |
| 8 | Dense | — |
| 9* | No infiltration | — |

*shows comparative example.

(Comparative Example)

On a pressed powder material of SiC similar to that of the Example, a molded material of MoSi$_2$ powder was placed. This was maintained at 2000° C. for 30 minutes in argon gas. Infiltration was found partially on the surface, but good infiltration was not observed on the entire specimen. To infiltrate to the entire specimen, temperature as high as 2050° C. or more was needed. Manufacturing condition and infiltration property of the specimen as well as property of surface film after oxidation test at 1500° C. for 22 hours are given in Example 1 of Table 2.

To evaluate the property of oxidation film, the surface of the composite material after oxidation test was examined. As a result, fine cracks were found all over the oxidation film. By X-ray diffraction, it was found that oxidation film crystallized almost completely to cristobalite, and cracks occurred due to difference in thermal expansion.

What we claim are:

1. A ceramic composite material with high heat-resistant property, comprising a porous preform of silicon carbide having porosity of 10–50% by volume, said preform being infiltrated with an aluminum silicide of molybdenum, which is expressed by a formula of Mo(Al$_x$Si$_{1-x}$)$_2$, where 0.1<x<0.5, wherein said composite only contains materials with a melting point of at least 1800° C.

2. A ceramic composite material with high heat-resistant property according to claim 1, wherein a molded material of silicon carbide powder, whisker, fiber, or calcined material of these substances is used as the porous preform of silicon carbide.

3. A ceramic composite material with high heat-resistant property according to claim 1, wherein SiC-Si reaction sintered material with Si removed from it is used as the porous preform of silicon carbide.

4. A ceramic composite material with high heat-resistant property according to claim 1, wherein the porous preform of silicon carbide is produced by firing a pressed powder material, comprising silicon carbide and less than 10 wt. % of boron, carbon, aluminum or mixture of these materials.

5. A ceramic composite material with high heat-resistant property according to claim 1, wherein powder with average particle size of 10 μm or less is used as raw material to produce the porous preform of silicon carbide.

6. The ceramic composite material of claim 1, wherein said composite has a relative density of 95% or more.

7. The ceramic composite material of claim 1, wherein said ceramic composite only contains materials with a melting point of at least 1900° C. or above.

* * * * *